US009538891B2

(12) United States Patent
Griffith (10) Patent No.: US 9,538,891 B2
(45) Date of Patent: Jan. 10, 2017

(54) CYCLONIC VACUUM CLEANER WITH IMPROVED COLLECTION CHAMBER

(71) Applicant: BISSELL Homecare, Inc., Grand Rapids, MI (US)

(72) Inventor: Aaron P. Griffith, Grand Rapids, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 665 days.

(21) Appl. No.: 13/958,963

(22) Filed: Aug. 5, 2013

(65) Prior Publication Data

US 2013/0318742 A1 Dec. 5, 2013

Related U.S. Application Data

(62) Division of application No. 12/478,421, filed on Jun. 4, 2009, now Pat. No. 8,499,411.

(60) Provisional application No. 61/058,995, filed on Jun. 5, 2008.

(51) Int. Cl.
| A47L 9/10 | (2006.01) |
|---|---|
| A47L 9/20 | (2006.01) |
| A47L 9/16 | (2006.01) |
| A47L 9/12 | (2006.01) |
| B04C 5/185 | (2006.01) |

(52) U.S. Cl.
CPC ............ *A47L 9/1608* (2013.01); *A47L 9/1658* (2013.01); *A47L 9/1683* (2013.01); *A47L 9/122* (2013.01); *A47L 9/1666* (2013.01); *B04C 5/185* (2013.01)

(58) Field of Classification Search
CPC .... A47L 9/1608; A47L 9/1658; A47L 9/1683; A47L 9/1666
USPC ............................................ 15/353
See application file for complete search history.

(56) References Cited

U.S. PATENT DOCUMENTS

| 1,380,698 A | 6/1921 | Anspach |
|---|---|---|
| 2,015,464 A | 9/1935 | Saint-Jacques |
| 3,513,642 A | 5/1970 | Cornett |
| 3,988,132 A | 10/1976 | Oranje |
| 3,988,133 A | 10/1976 | Schady |
| 5,137,554 A | 8/1992 | Carter, Jr. |
| 6,129,775 A | 10/2000 | Conrad et al. |
| 6,171,356 B1 | 1/2001 | Twerdum |
| 6,192,550 B1 | 2/2001 | Hamada et al. |
| 6,228,151 B1 | 5/2001 | Conrad et al. |
| 6,312,594 B1 | 11/2001 | Conrad et al. |
| 6,461,508 B1 | 10/2002 | Thomson |
| 6,502,278 B2 | 1/2003 | Oh et al. |

(Continued)

FOREIGN PATENT DOCUMENTS

| DE | 2738850 A1 | 3/1979 |
|---|---|---|
| EP | 0728435 A1 | 8/1996 |

(Continued)

*Primary Examiner* — Bryan R Muller
(74) *Attorney, Agent, or Firm* — McGarry Bair PC (57) ABSTRACT

A vacuum cleaner with a cyclone module assembly comprises a cyclone separation chamber for separating dust and debris from air and a collection chamber for collecting dust and debris that is separated from the air in the cyclone separation chamber. The cyclone module assembly further includes at least one feature for directing contaminants downwardly, such as a helical step dividing the separation chamber from the collection chamber or a circumferential fin that extends from the inside wall of the collection chamber.

8 Claims, 12 Drawing Sheets

(56) References Cited

U.S. PATENT DOCUMENTS

| | | |
|---|---|---|
| 6,533,834 B2 | 3/2003 | Conrad et al. |
| 6,616,721 B2 | 9/2003 | Oh |
| 6,732,406 B2 | 5/2004 | Oh |
| 6,810,557 B2 | 11/2004 | Hansen et al. |
| 6,837,912 B1 | 1/2005 | Heumann |
| 7,065,826 B1 | 6/2006 | Arnold |
| 7,586,616 B2 | 9/2009 | Ran et al. |
| 7,588,616 B2 | 9/2009 | Conrad et al. |
| 8,176,597 B2 * | 5/2012 | Stein .................... A47L 9/1608 15/353 |
| 2001/0025395 A1 | 10/2001 | Matsumoto et al. |
| 2005/0066469 A1 | 3/2005 | Oh et al. |
| 2005/0138763 A1 * | 6/2005 | Tanner .................... A47L 9/165 15/353 |
| 2007/0067944 A1 | 3/2007 | Kitamura et al. |
| 2007/0209519 A1 | 9/2007 | Conrad |
| 2008/0010957 A1 | 1/2008 | Yun et al. |
| 2008/0047091 A1 | 2/2008 | Nguyen |

FOREIGN PATENT DOCUMENTS

| | | | |
|---|---|---|---|
| EP | 1136028 A2 | 9/2001 | |
| GB | 2298598 A | 9/1996 | |
| GB | 2370979 A | 7/2001 | |
| GB | 253862 A | 4/2009 | |
| WO | 2005053494 A2 | 11/2004 | |
| WO | WO 200708772 A2 * | 1/2007 | ............... A47L 9/16 |

\* cited by examiner

Fig. 8

CYCLONIC VACUUM CLEANER WITH IMPROVED COLLECTION CHAMBER

CROSS-REFERENCE TO RELATED APPLICATION

This application is a divisional of U.S. patent application Ser. No. 12/478,421, filed Jun. 4, 2009, which claims the benefit of U.S. Provisional Patent Application No. 61/058,995, filed Jun. 5, 2008, both of which are incorporated herein by reference in their entirety.

BACKGROUND OF THE INVENTION

Field of the Invention

The invention relates to suction cleaners, and in particular to suction cleaners having cyclonic dirt separation. In one of its aspects, the invention relates to an improved collection chamber configured to prevent debris re-entrainment.

Description of the Related Art

Upright vacuum cleaners employing cyclone separators are well known. Some cyclone separators follow textbook examples using frusto-conical shape separators and others use high-speed rotational motion of the air/dirt to separate the dirt by centrifugal force. Typically, working air enters and exits at an upper portion of the cyclone separator as the bottom portion of the cyclone separator is used to collect debris. Furthermore, in an effort to reduce weight, the motor/fan assembly that creates the working air flow is typically placed at the bottom of the handle, below the cyclone separator.

U.S. Pat. No. 6,810,557 to Hansen et al. discloses an upright vacuum cleaner that has a cyclone separator and a dirt cup. A horizontal plate separates the cyclone separator from the dirt cup. The air flowing through the cyclone separator passes through an annular cylindrical cage with baffles and through a cylindrical filter before exiting the cyclone separator at the upper end thereof. The dirt tank has fins that project vertically from a sidewall and from the bottom wall to reduce re-entrainment of dirt particles. This patent is incorporated herein by reference in its entirety.

EP 0 728 435 to Black & Decker discloses a cyclone dust extractor that has a cyclone separator and a dust collector that is below and separable from the cyclone separator. A cylindrical collar extends inwardly and downwardly from a lower portion of the inner surface of the side wall of the dust collector and against which is said large dust and debris particles collide, thereby assisting in removing the dust and debris from the air flow and depositing it in the dust collector. These dust and debris particle will accumulate in the inverted pocket formed by the collar when the dust collector is inverted to empty the dust and debris from the dust collector. A similar construction is disclosed in the Oh U.S. Pat. No. 6,502,278.

SUMMARY OF THE INVENTION

According to one aspect of the invention, a vacuum cleaner comprises a housing defining a cyclonic separator chamber for separating contaminants from a dirt-containing airstream and a collection chamber for receiving contaminants separated in the separator chamber, the housing comprising: a side wall; a bottom wall; an inlet in fluid communication with the separator chamber; and an outlet in fluid communication with the separator chamber; a suction nozzle fluidly connected with the inlet; and a suction source fluidly connected to the suction nozzle and to the separator chamber for establishing and maintaining a dirt-containing airstream from the suction nozzle to the inlet; wherein the sidewall comprises a lower collection chamber wall defining the collection chamber, an upper separator chamber wall defining the separator chamber, and a helical step joining the collection chamber wall and the separator chamber wall and dividing the separator chamber from the collection chamber to direct contaminants toward the bottom wall; and wherein the circumference of the collection chamber wall is larger than the circumference of the separator chamber wall.

According to another aspect of the invention, a vacuum cleaner comprises a cyclone separator having at least one separator chamber for separating contaminants from a dirt-containing airstream, and further comprising an inlet and an outlet in fluid communication with the separator chamber; a collection chamber associated with the cyclone separator for receiving contaminants separated in the separator chamber and having a sidewall and a bottom wall; a suction nozzle fluidly connected with the inlet; a suction source fluidly connected to the suction nozzle and to the separator chamber for establishing and maintaining a dirt-containing airstream from the suction nozzle to the inlet; and a single circumferential fin extending inwardly from the sidewall of the collection chamber, wherein the fin is configured to reduce debris re-entrainment in the collection chamber.

DESCRIPTION OF THE PREFERRED EMBODIMENT

Figure 1:
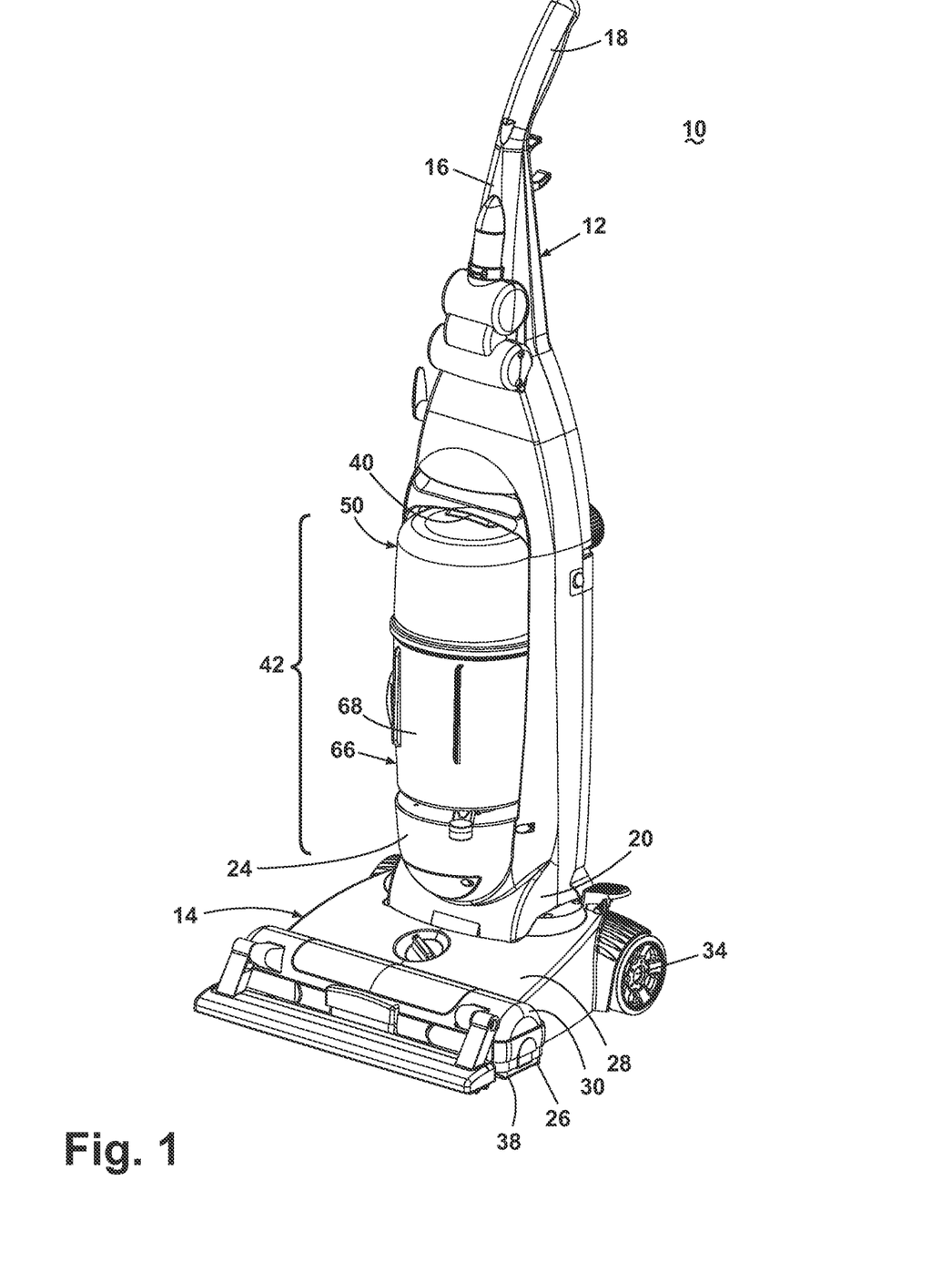
FIG. 1 is a perspective view of an upright vacuum cleaner having a cyclone module assembly with an improved dirt cup according to a first embodiment of the invention.

Referring to the drawings, and in particular to FIG. 1, an upright vacuum cleaner 10 comprises an upright handle assembly 12 pivotally mounted to a foot assembly 14. The handle assembly 12 further comprises a primary support section 16 with a grip 18 on one end to facilitate movement by a user. A motor cavity 20 is formed at an opposite end of the handle assembly 12 to contain a conventional suction source such as a vacuum fan/motor assembly 22 (FIG. 6) oriented transversely therein. A filter housing 24 is formed above the motor cavity 20 and is in fluid communication with the vacuum fan/motor assembly 22. The handle assembly 12 pivots relative to the foot assembly 14 through a pivot axis that is coaxial with a motor shaft (not shown) associated with the vacuum fan/motor assembly 22. A recess 40 on the primary support section 16 of the handle assembly 12 receives a cyclone module assembly 42 according to a first embodiment of the invention.

The foot assembly 14 comprises a lower housing 26 that mates with an upper housing 28 to form a brush chamber 30 therebetween. While not shown, a rotating brush roll assembly can be positioned within the brush chamber 30 and operably connected to the motor shaft of the vacuum fan/motor assembly 22 (FIG. 6) via a stretch belt as is common in the vacuum cleaner art. Rear wheels 34 are secured to a rearward portion of the foot assembly 14 and a pair of support wheels (not shown) are secured to the foot assembly 14 between the brush chamber 30 and rear wheels 34 for moving the foot assembly 14 over a surface to be cleaned. A suction nozzle 38 is formed at a lower surface of the brush chamber 30 on the foot assembly 14 and is in fluid communication with the vacuum fan/motor assembly 22.

Referring to FIGS. 2 through 4B, the cyclone module assembly 42 of the first embodiment further comprises a cyclone separator 50 for separating contaminants from a dirt-containing airsteam and a dirt cup assembly 66 for receiving contaminants separated by the cyclone separator 50. The cyclone separator 50 includes a first stage cyclone housing 56 defining, in part, a first stage separator chamber 48, and an inner second stage cyclone housing 52 defining, in part, a second stage separator chamber 46. The first stage cyclone housing 56 comprises a generally cylindrical outer wall 62 having an upper wall 61 forming a closed top and an open bottom, a cyclone inlet 57 formed in the outer wall 62 and a cyclone outlet 59 formed on the upper wall 61. A first stage debris outlet 58 is formed by a gap between a separator plate 60 and the outer wall 62. The separator plate 60 separates the first stage separator chamber 48 from the dirt cup assembly 66.

Figure 3:
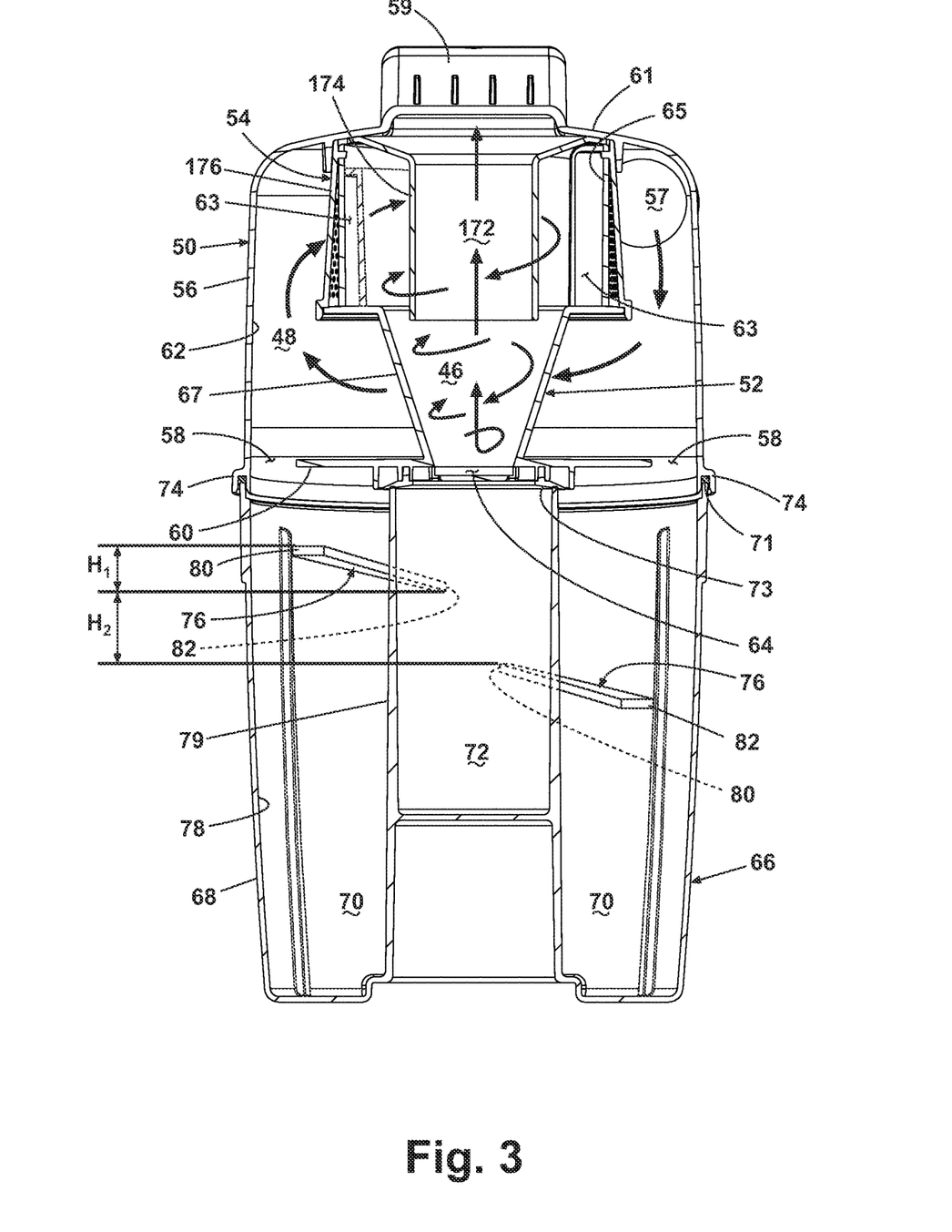
FIG. 3 is a cross-sectional view of the cyclone module assembly taken through line 3-3 of FIG. 2

As shown in FIG. 3, the frusto-conical shaped second stage cyclone housing 52 depends from the upper wall 61 of the first stage cyclone housing 56 and includes an upper cylindrical portion 65 and a lower frusto-conical portion 67 which mounts the separator plate 60. A pair of opposed inlets 63 are formed in the cylindrical portion 65 and a second debris outlet 64 is formed in the bottom of the frusto-conical portion 67.

A grill assembly 54 is positioned around the cylindrical portion 65 and separates the first stage separator chamber 48 from the second stage separator chamber 46. The grill assembly 54 includes an outer perforated wall 176 and an inner wall forming a vortex finder 174. The vortex finder 174 defines a second stage outlet aperture 172 that is in fluid communication with the cyclone outlet 59.

The dirt cup assembly 66 comprises a dirt cup housing 68 having an outer housing wall 78 and an inner housing wall 79 spaced from the outer housing wall 78 in concentric relation. A first stage collection chamber 70 is formed between the housing walls 78, 79 and a second stage collection chamber 72 is formed within the inner housing wall 79 and is sealed off from the first stage collection chamber 70. The dirt cup assembly 66 sealingly mates with the cyclone separator 50 via a lip 74 formed on a lower surface of the outer wall 62. A first gasket 71 is positioned between the lip 74 and the upper edge of the outer housing wall 78. The inner housing wall 79 sealingly mates with a lower surface of the second stage cyclone housing 52 such that the second debris outlet 64 is in fluid communication with the second stage collection chamber 72 and isolated from the first stage debris outlet 58. A second gasket 73 is positioned between the separator plate 60 and the upper edge of the inner housing wall 79.

Figure 4A:
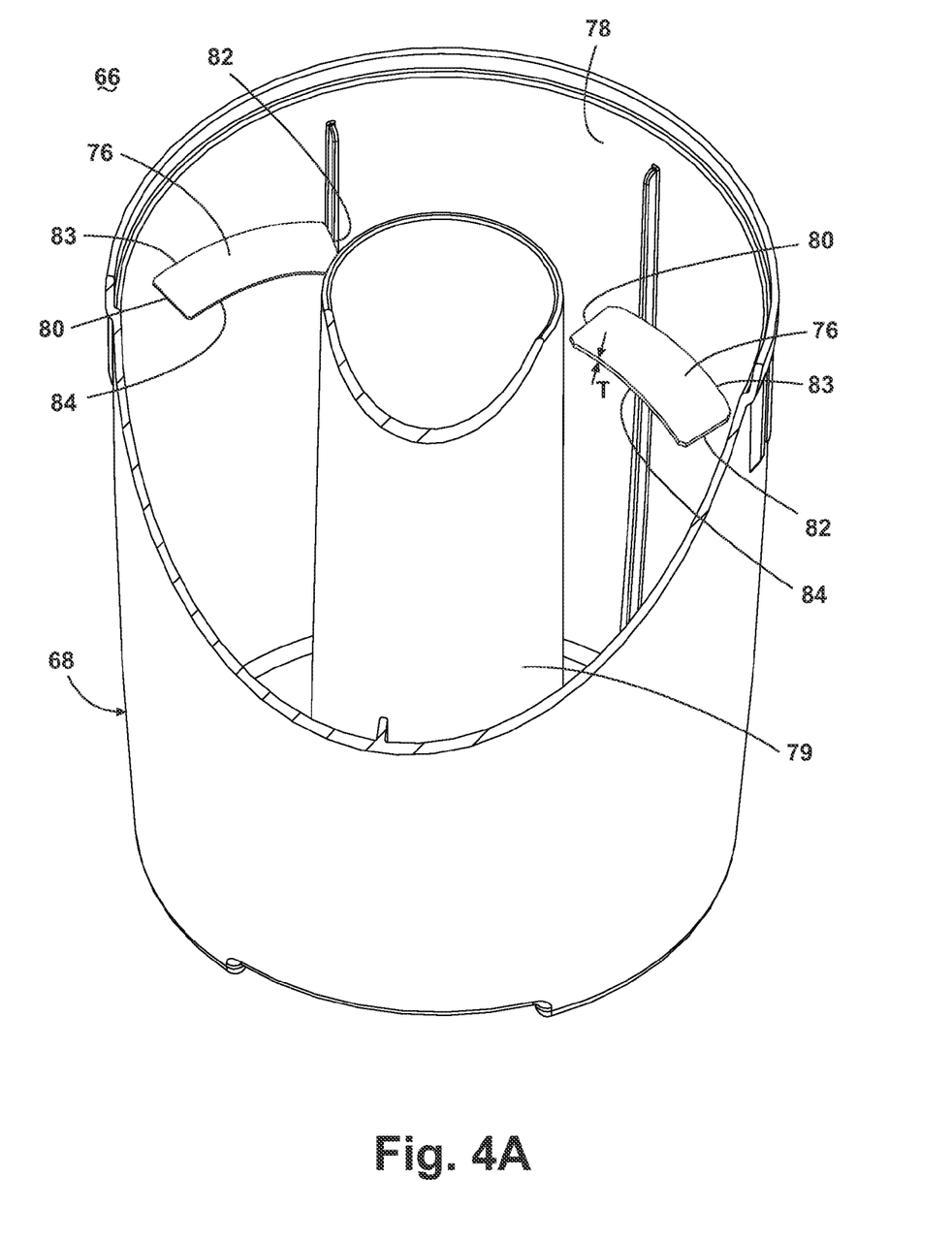
FIG. 4A is a partial cut-away perspective view of the dirt cup shown in FIG. 1.

The dirt cup assembly 66 further comprises at least one circumferential fin 76 that extends inwardly from an interior surface of the outer housing wall 78. The fin 76 functions to direct or urge debris to the bottom of the collection chamber 70 and keep the separated debris contained in the first stage collection chamber 70. Each fin 76 comprises a leading end 80 and a trailing end 82 and has an outer edge 83 that is attached to the outer housing wall 78 and an inner arcuate edge 84 that is free. In terms of the working air flow, the leading end 80 of each fin 76 is upstream of the trailing end 82. Optionally, the arcuate edge 84 conforms to the shape of the outer housing wall 78 and can be parallel to the outer housing wall 78.

Figure 2:
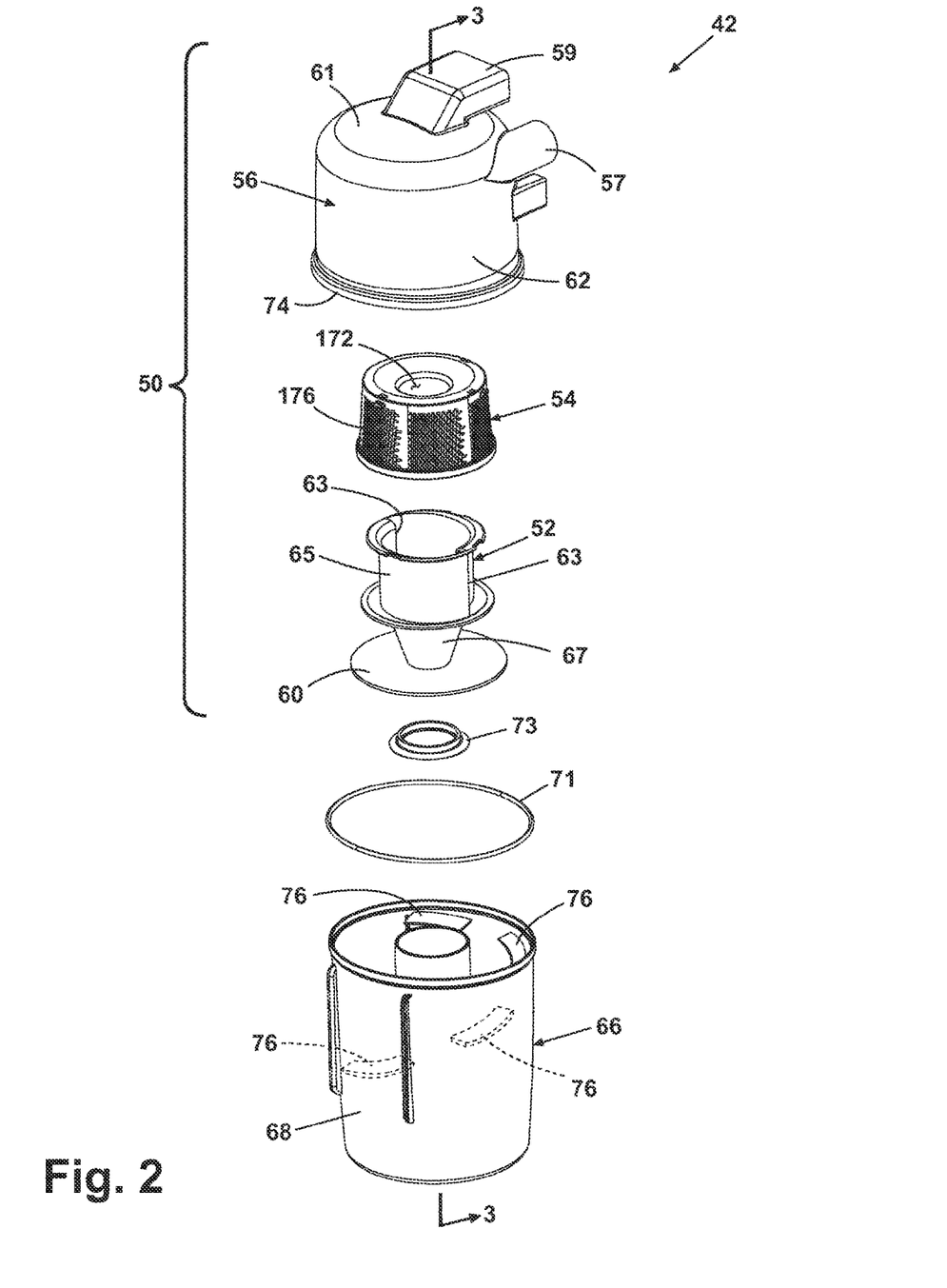
FIG. 2 is an exploded right front quarter perspective view of the cyclone module assembly of FIG. 1.
Figure 4B:
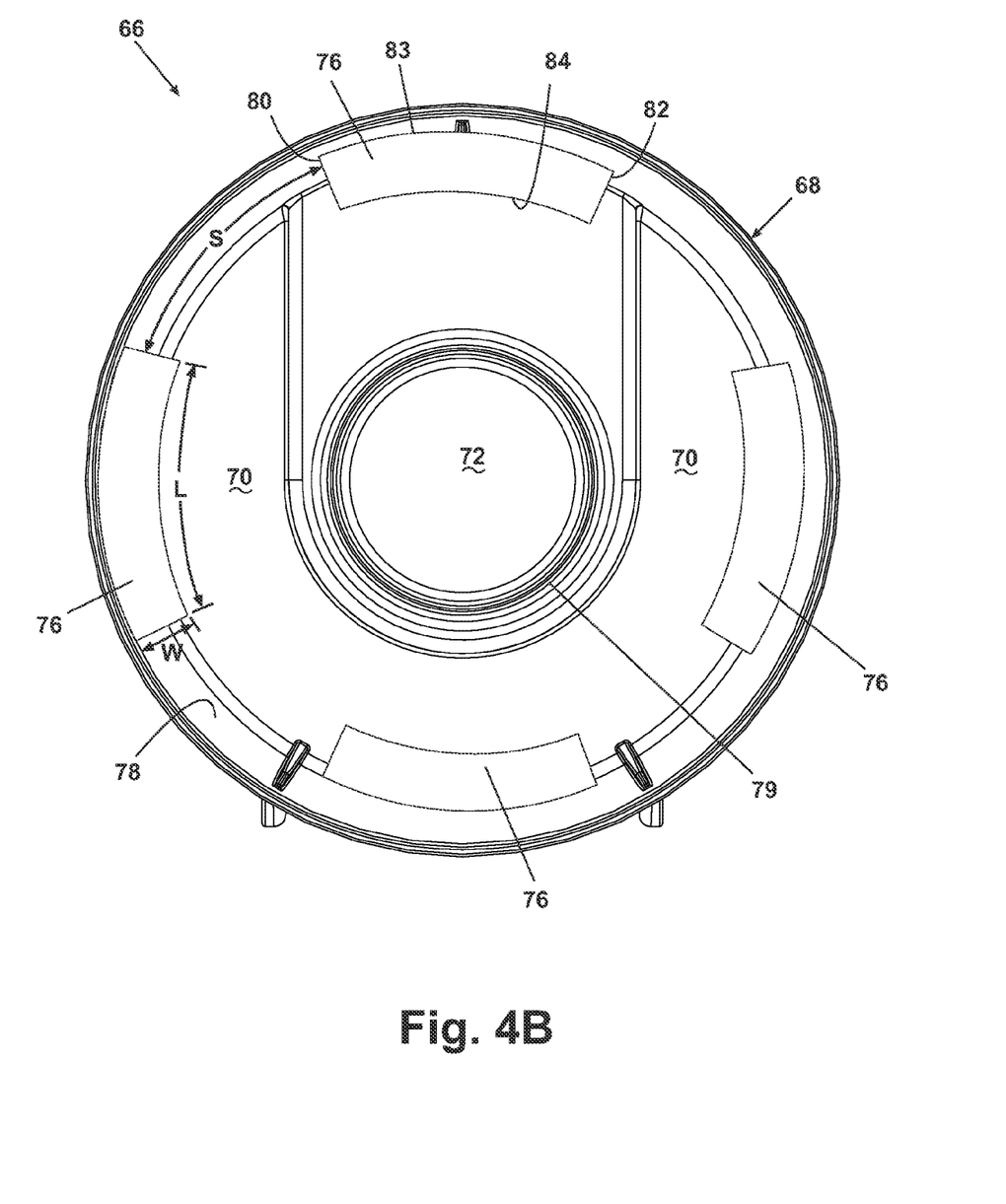
FIG. 4B is a top view of the dirt cup assembly shown in FIG. 4A.

In the illustrated embodiment, multiple intermittently spaced fins 76 are employed. Four spaced fins are shown in FIGS. 2 and 4B. Each fin 76 extends in a perpendicular radial direction from the housing outer wall 78 but is preferably oriented in a circumferential direction at an oblique angle with respect to the horizontal, with the leading end 80 vertically spaced above the trailing end 82. Furthermore, adjacent fins 76 can be arranged in a helical fashion, i.e. along a helical trajectory and furthermore can be vertically staggered such that the leading end 80 of a first fin 76 is vertically spaced from the trailing end 82 of a second, adjacent fin 76. However, each fin 76 extends horizontally inwardly from the outer wall 78 toward the center of the dirt cup housing 68.

The fins 76 can have a length L of approximately 1.0 to 6.0 inches (25.4 to 152.4 mm), a width W of approximately 0.125 to 1.0 inches (about 3 to 25 mm) wide, and a thickness T of approximately 0.040 to 0.125 inches (about 1 to 3 mm). More specifically, the fins 76 can have a length L of approximately 3.0 inches (about 76 mm), a width W of approximately ⅜ inches (about 9-10 mm) wide, and a thickness T of approximately 1/16 inches (about 1-2 mm). It has been discovered that a combination of the given specific dimensions for the length L, width W, and thickness T, and spacing the fins 67 intermittently in a helical fashion such that the leading end 80 is above the trailing end 82 achieves the best separation efficiency, i.e. the most debris separation coupled with the least re-entrainment of debris. The lateral spacing S between fins 76 can measure from about 0.25 inches (about 6-7 mm) to about 4.0 inches (about 100 mm); however, a preferred distance is about 1.25 inches (about 32 mm). The lateral spacing S between the fins 76 facilitates debris removal as will be described in more detail. Optionally, the difference in height $H_1$ between the leading end 80 and the trailing end 82 of one of the fins 76 can range from 0.125 to 2.0 inches (about 3 to 51 mm) or be approximately 0.5 inches (about 12.5-13 mm). Furthermore, adjacent fins 76 can optionally be staggered vertically relative to each other such that the difference in height $H_2$ between the leading end 80 of a first fin 76 and the trailing end 82 of a second, adjacent fin 76 is in the range of 0.125 to 2.0 inches (about 3 to 51 mm), preferably approximately 0.5 inches (12.5-13.0 mm).

Figure 4C:
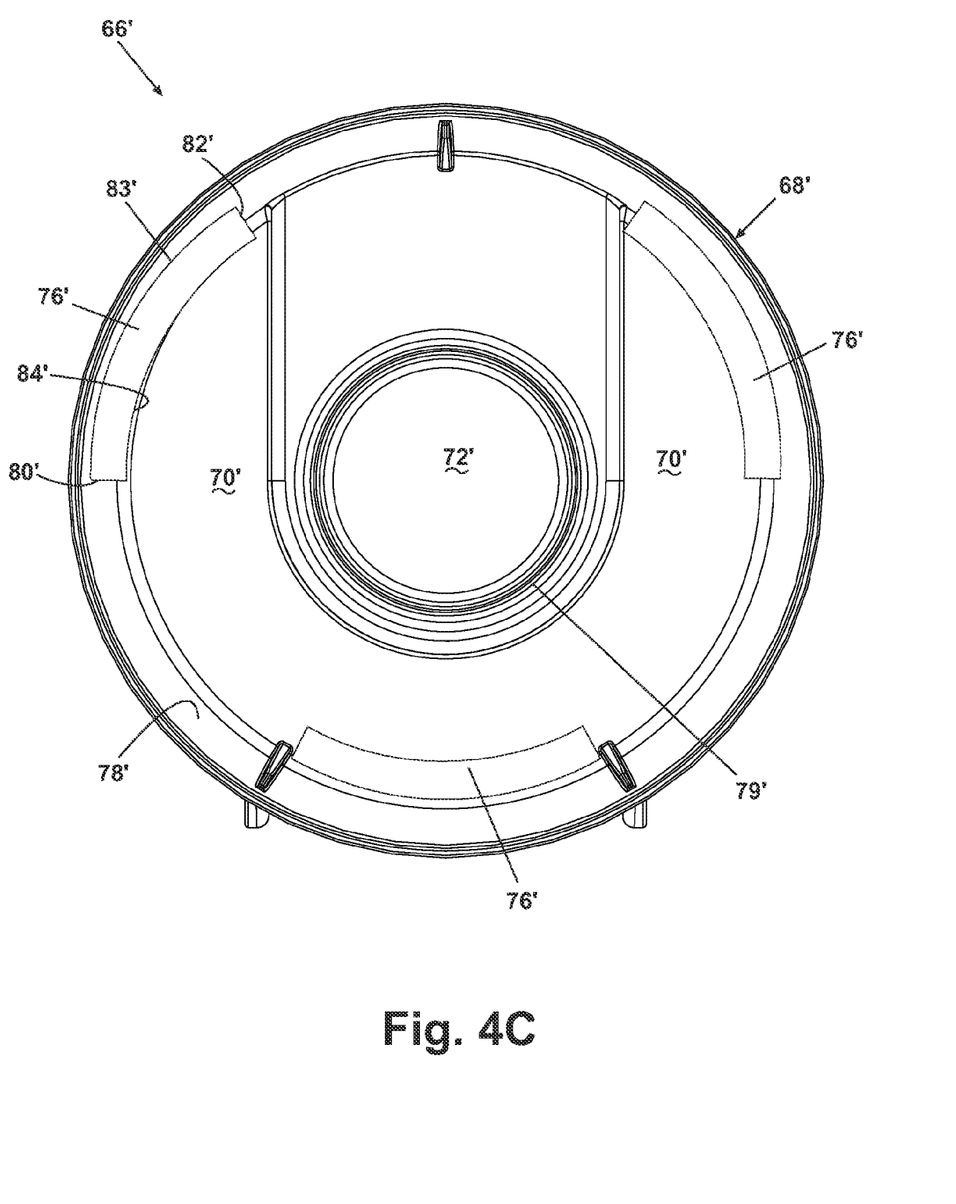
FIG. 4C is a top view of a dirt cup assembly according to a second embodiment of the invention.

Referring to FIG. 4C, a dirt cup assembly 66' according to a second embodiment of the invention is shown. The dirt cup assembly 66' is substantially identical to the dirt cup assembly 66 shown in FIG. 4B, except for the fin arrangement, which comprises three intermittently spaced fins 76'.

Figure 4D:
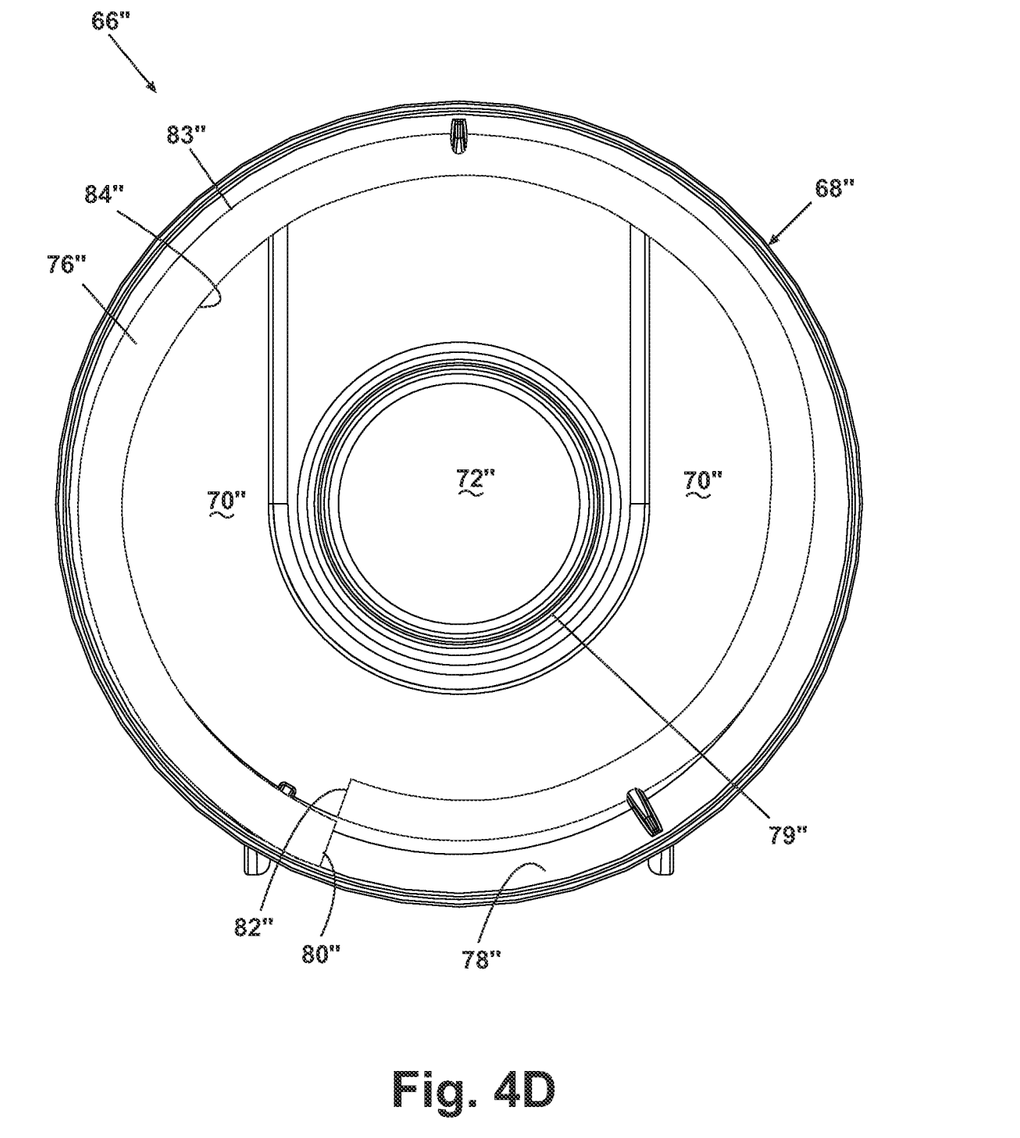
FIG. 4D is a top view of a dirt cup assembly according to a third embodiment of the invention.

Referring to FIG. 4D, a dirt cup assembly 66" according to a third embodiment of the invention is shown. The dirt cup assembly 66" is substantially identical to the dirt cup assembly 66 shown in FIG. 4B, except for the fin arrangement, which comprises a single fin 76". The fin 76" can extend in a helical or spiral fashion around the outer housing wall 78". Optionally, the fin 76" can extend less than 360° around the circumference of the wall 78" so that the leading end 80" does not overlap the trailing end 82" or the fin 76" can extend more than 360° around the circumference of the wall 78" so that the leading end 80" overlaps the trailing end 82". Alternately, as illustrated herein, the fin 76" can extend approximately 360° around the circumference of the wall 78" such that the leading end 80" and the trailing end 82" lie along a common plane.

Figure 4E:
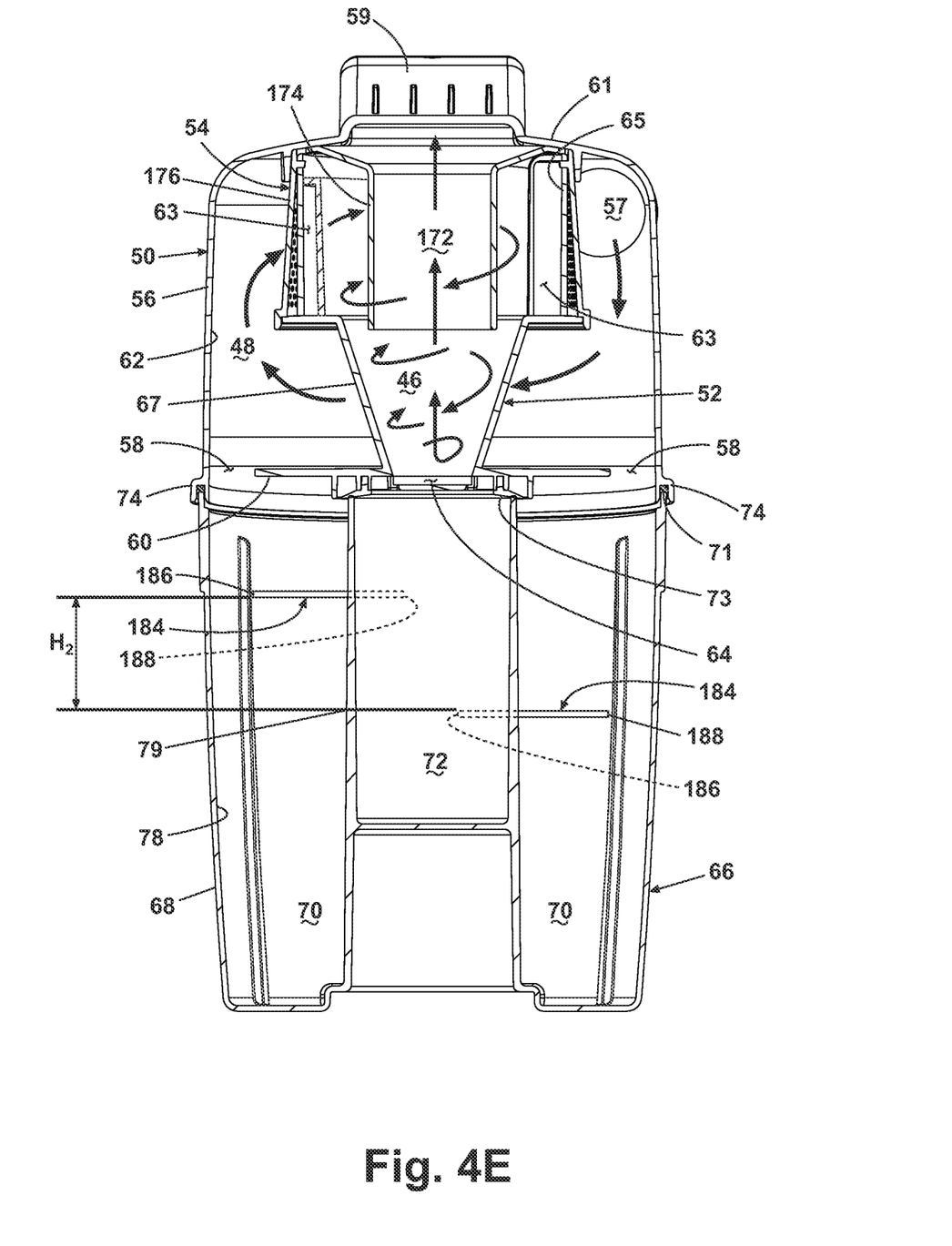
FIG. 4E is a cross-sectional view of a cyclone module assembly according to a fourth embodiment of the invention.

Referring to FIG. 4E, a cyclone module assembly 42 according to a fourth embodiment of the invention is shown. The cyclone module assembly 42 is substantially identical to the cyclone module assembly 42 shown in FIG. 3, except for the fin arrangement, and like elements will be referred to with like reference numerals. As illustrated, the third embodiment comprises at least one partial circumferential fin 184 that extends horizontally inwardly from an interior surface of the outer housing wall 78 and functions to direct or urge debris to the bottom of the collection chamber 70 and keep the separated debris contained in the first stage collection chamber 70. Each fin 184 is discontinuous in that it extends only partially around the circumference of the collection chamber 70 and comprises a leading end 186 and a trailing end 188. In terms of the working air flow, the leading end 186 of each fin 184 is upstream of the trailing end 188.

In the illustrated embodiment, multiple intermittently spaced fins 184 are employed. Two fins 184 are visible in FIG. 4E, but is envisioned that 3 or more fins can be employed with this embodiment. Each fin 184 is preferably oriented horizontally, with the leading end 186 and the trailing end 188 lying along a common horizontal plane. In addition, each fin 184 extends radially in a perpendicular direction (or horizontally) from the outer wall 78 toward the center of the dirt cup housing 68 so that dust and debris does not accumulate under the spaced fins when the collection chamber 70 is inverted for emptying. Although not shown, each fin 184 can extend inwardly and upwardly at an acute angle to the outer wall 78, if desired. The intermittently spaced fins 184 also provide slightly improved efficiency of separation and ease of dumping the dust and debris than annular fins as, for example, illustrated in the prior art references cited above. Furthermore, adjacent fins 184 can be vertically staggered so that the leading end 186 of a first fin 184 is vertically spaced from the trailing end 188 of a second, adjacent fin 184. The fins 184 can have the same dimensions given above for the first embodiment, except that the fins 184 will not have a height $H_1$ since the leading end 186 and trailing end 188 lie along a common horizontal plane.

Figure 5:
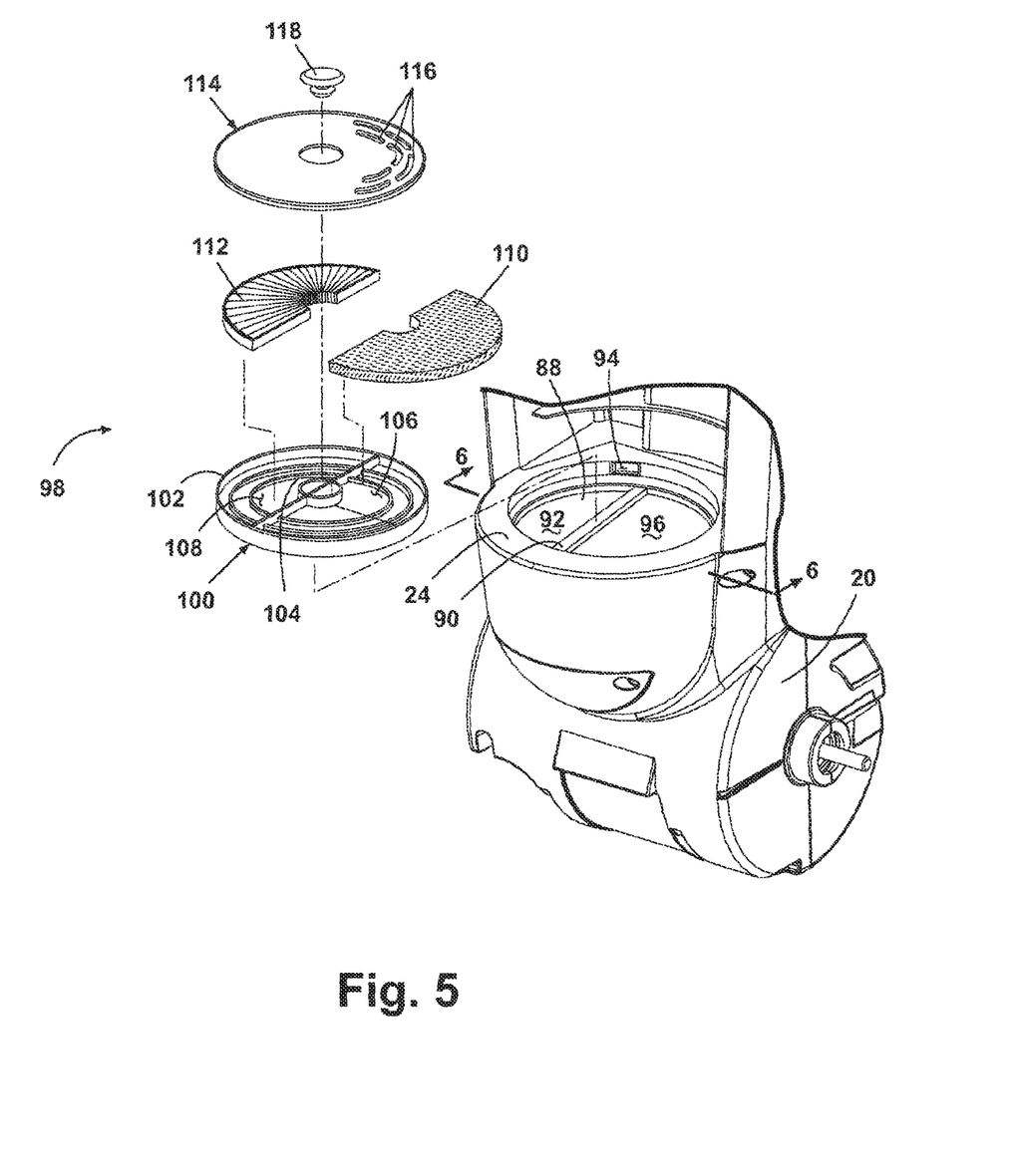
FIG. 5 is a partial exploded view of a filter cartridge and a filter housing of the upright vacuum cleaner shown in FIG. 1
Figure 6:
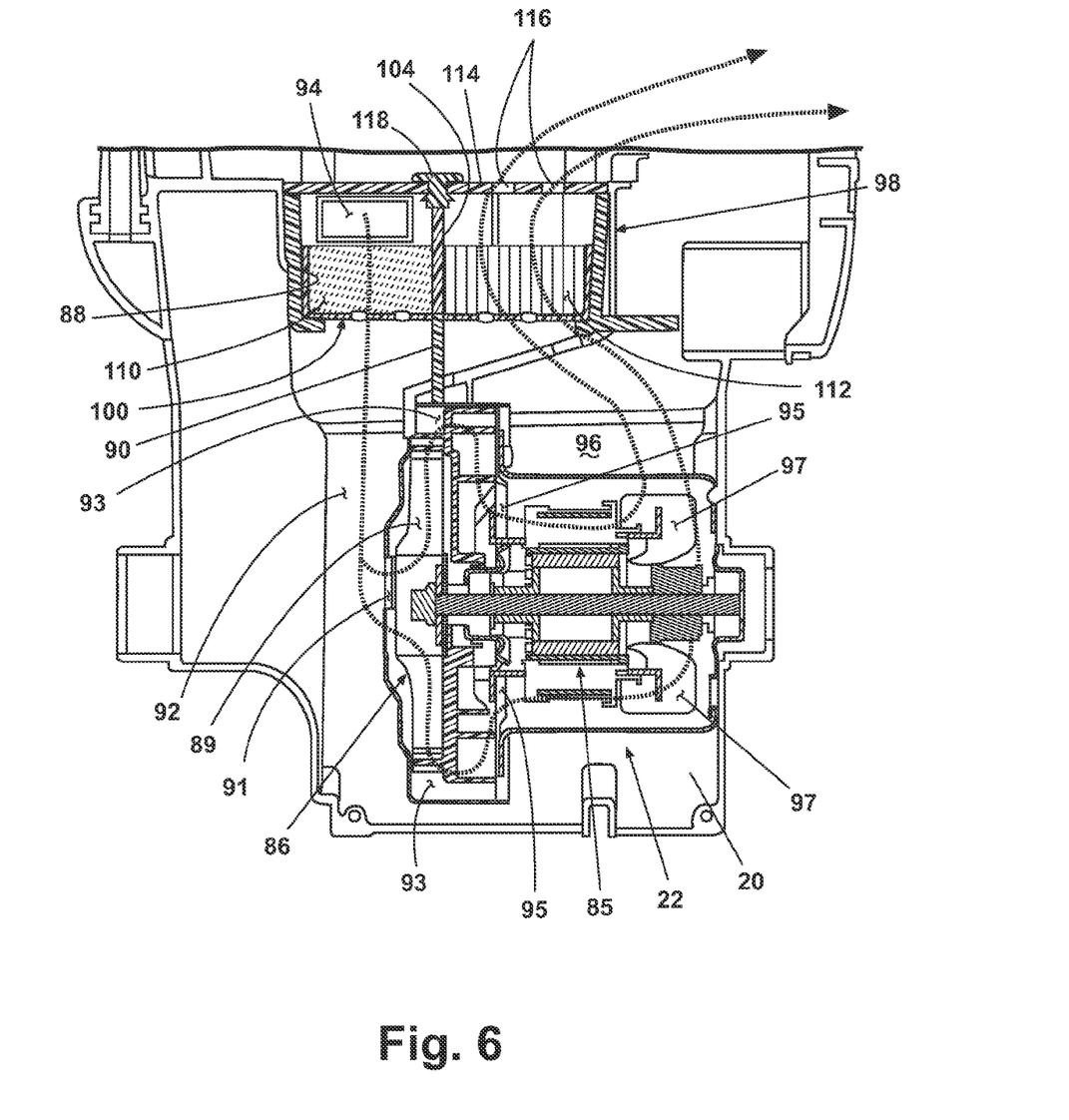
FIG. 6 is a cross-sectional view of the filter housing and a motor housing of the upright vacuum cleaner taken through line 6-6 of FIG. 5.

As shown in FIGS. 5 and 6, the vacuum fan/motor assembly 22 comprises a motor assembly 85 and a fan assembly 86. The vacuum fan/motor assembly 22 further includes a fan chamber 89 in fluid communication with a working air inlet 91 and a working air outlet 93. The motor assembly 85 includes a motor cooling air inlet 95 and a motor cooling air outlet 97.

The filter housing 24 comprises a filter compartment 88 having a dividing wall 90 that separates the filter compartment 88 into a working air inlet region 92 and a working air outlet region 96 that is separate from the working air inlet region 92. The working air inlet region 92 fluidly communicates a working air conduit 94, which is in fluid communication with the cyclone outlet 59 (FIG. 2) with the working air inlet 91 of the fan chamber 89 after passing the working air through a pre-motor filter. The working air outlet region 96 fluidly communicates the motor cooling outlet 97 with the external atmosphere after passing the working air through an exhaust filter.

A substantially disk shaped filter cartridge or assembly 98 is sealed within the filter compartment 88. In one embodiment, the filter assembly 98 comprises a substantially rigid filter frame 100 comprising a vertical annular wall 102 formed in a circular shape, with a dividing wall 104, which can be substantially aligned with the dividing wall 90, formed across the center thereof to divide the filter frame 100 into two distinct regions; a pre-motor filter region 106 and an exhaust filter region 108. The pre-motor filter region 106 and exhaust filter region 108 are bounded by a section of the annular wall 102 and the dividing wall 104 and have a semi-circular shape. The pre-motor filter region 106 preferably receives a commonly known filter media 110 such as open cell foam or other known suitable material that is formed to fit the semi-circular shape of the region 106. The exhaust filter region 108 preferably receives known filter media 112 such as pleated paper, HEPA media, pleated HEPA media, non-woven filter media, or the like, and is also formed in a semi-circular shape. Optionally the filter media 110 can be removable from the filter frame 100 and that filter media 112 can be sealed to the filter frame 100 with a suitable sealant such as silicone or the like. A filter cover 114 is sealingly fixed to the top surface of the filter frame 100 and seals each distinct filter region 106, 108 from the other. The filter cover 114 comprises a plurality of exhaust apertures 116 above the exhaust filter region 108 in fluid communication with the external atmosphere. The filter cover 114 is preferably user removable via a commonly known twist lock latch 118 or other mechanism such as a hinged cover with retaining latch to allow easy user-access to the filter media 110, 112 for replacing or cleaning thereof. The filter cover 114 can also include a keying feature (not shown) to permit only a unique orientation of the cover 114 on the filter frame 100.

Referring to FIGS. 3 and 6, in which the flow path of air is indicated by arrows, the operation of the separators will be described. The vacuum fan/motor assembly 22 is positioned downstream of the cyclone outlet 59 such that when energized, establishes and maintains a dirt-containing airstream from the suction nozzle 38 to the cyclone separator 50. The vacuum fan/motor assembly 22 draws air from the suction nozzle 38 (FIG. 1) to the cyclone inlet 57 and into the cyclone separator 50 where the dirty air to swirls around the first stage separator chamber 48. Larger debris falls into the first stage collection chamber 70 of the dirt cup assembly 66 via the gap 58. The intermittently spaced fins 76 force the debris to the bottom of the collection chamber 70 and keep the separated debris contained in the first stage collection chamber 70. The working air then passes through the outer perforated wall 176 of the grill assembly 54 to filter out any remaining large debris and enters the second stage separator chamber 46 via the second stage inlet inlets 63. The second stage inlets 63 direct the air tangentially and downwardly along an inside surface of the second stage cyclone housing 52. The airflow turns near the second stage debris outlet 64 and proceeds directly upward to the second stage outlet aperture 172 and through the cyclone outlet 59. The dirt removed in the second stage separator chamber 46 falls into the second stage collection chamber 72.

From the cyclone outlet 59, the working air travels through the working air conduit 94 and is delivered to the pre-motor filter region 106 of the filter assembly 98 where any remaining small dust particles are trapped by the filter media 110 prior to the air being drawn into the vacuum fan/motor assembly 22. Working air is then drawn into the working air inlet 91, through the fan chamber 89 and is exhausted through the working air outlet 93. The working air then enters the motor cooling inlet 95, is drawn over the motor assembly 85, thereby reducing its working temperature, and is then exhausted through the motor cooling outlet 97. From the motor cooling outlet 97, the working air travels through the outlet region 96 and is forced through the exhaust filter region 108 of the filter assembly 98, where any remaining debris or brush motor dust is trapped in the exhaust filter media 112, and, finally, through the exhaust apertures 116 in the filter cover 114 and into the external atmosphere.

To dispose of collected dirt and dust, the dirt cup assembly 66 is detached from the cyclone separator 50 to provide a clear, unobstructed path for the debris captured in both the first stage collection chamber 70 and the second stage collection chamber 72 to be removed. Dust and dirt disposal is accomplished by inverting the dirt cup assembly 66.

Figure 7:
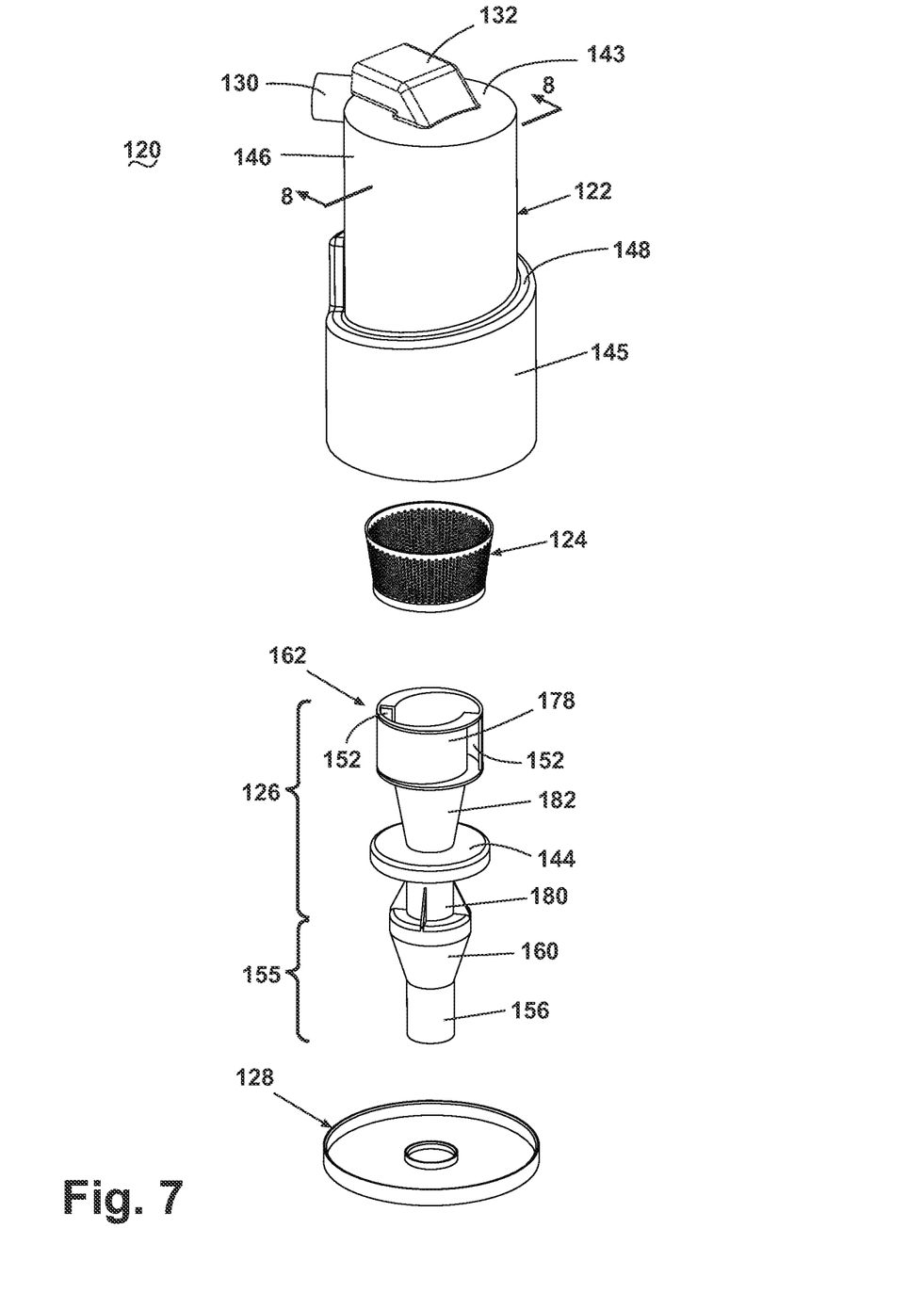
FIG. 7 is an exploded perspective view of a cyclone module assembly according to a fifth embodiment of the invention.
Figure 8:
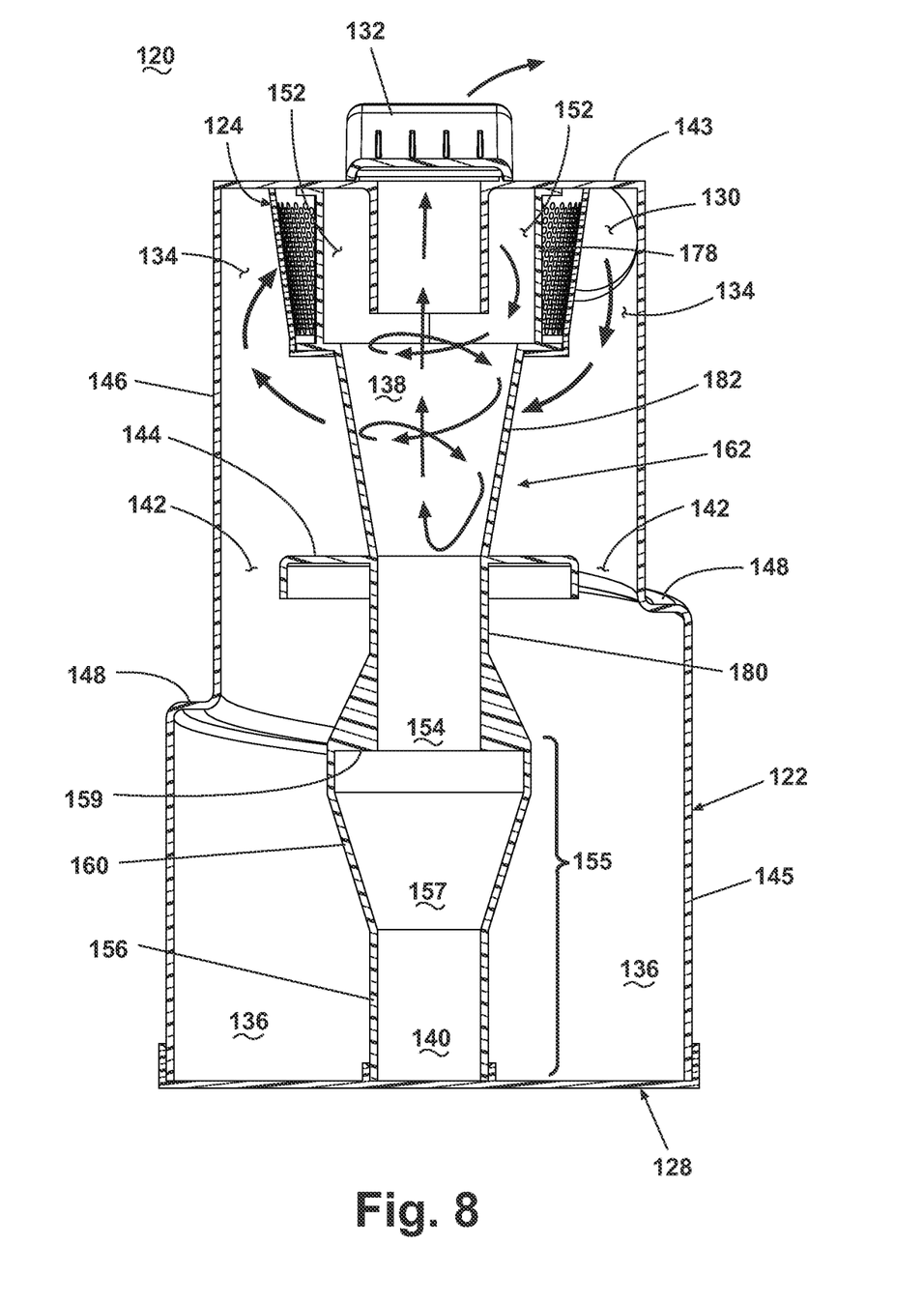
FIG. 8 is a cross-sectional view of the cyclone module assembly taken through line 8-8 of FIG. 7.

Referring to FIGS. 7 and 8, a cyclone module assembly 120 according to a fifth embodiment of the invention is shown and comprises an outer housing 122, a grill assembly 124, an inner housing 162, and a bottom debris release door 128. The outer housing 122 has an open bottom that can be selectively closed by the door 128, a closed top formed by an upper wall 143 and a side wall comprising a lower dirt cup wall 145 joined with an upper first stage separation chamber wall 146 via an inward step 148 such that the dirt cup wall 145 has a larger circumference than the first stage separation chamber wall 146. The inward step extends around the circumference of the housing 122 along an advancing helical trajectory. The outer housing 120 further comprises a working air inlet 130 formed in the first stage separation chamber wall 146 an outlet 132 formed in the upper wall 143. The outlet 132 can be in fluid communication with the conduit 94 (FIGS. 5 and 6).

The cyclone module assembly 120 further comprises a first stage separation chamber 134, a first stage collection chamber 136, a second stage separation chamber 138, and a second stage collection chamber 140. The first stage cyclone separation chamber 134 is formed between the grill assembly 124 and the first stage separation chamber wall 146. A first stage debris outlet 142 is formed by a gap between a separator plate 144 mounted on the inner housing 162 and the first stage separation chamber wall 146. The first stage collection chamber 136 is formed between the inner housing 162 and the dirt cup wall 145. The junction between the first stage separation chamber 134 and its corresponding collection chamber 136 is defined by the inward step 148. In other words, the inward step 148 divides the first stage separation chamber 134 from the collection chamber 136.

The inner housing 162 is positioned between the upper wall 143 and the release door 128 and comprises a frusto-conical separator 126 and a second stage debris collector 155 beneath the frusto-conical separator 126. The frusto-conical separator 126 defines the second stage separation chamber 138, which is positioned concentrically and in series with the first stage separator chamber 134, and includes an upper cylindrical portion 178, a lower cylindrical portion 180 which mounts the separator plate 144, and a cone-shaped portion 182 formed between the cylindrical portions 178, 180. A pair of opposed inlets 152 are formed in the upper cylindrical portion 178 and a second debris outlet 154 is formed in the lower cylindrical portion 180. The debris outlet 154 is fluidly connected to the second stage debris collector 155.

The second stage debris collector 155 comprises a second cone-shaped portion 160 and a debris collection cylinder 156 beneath the cone-shaped portion 160. The cone-shaped portion 160 defines a frusto-conical chamber 157 that terminates into the cylindrical second stage debris collection chamber 140, which is defined by the debris collection cylinder 156. The frusto-conical chamber 157 flares outwardly from the second stage debris outlet 154 to create a horizontal step 159 that extends outwardly from the perimeter of the lower cylindrical portion 180. The cone-shaped portion 160 extends downwardly and inwardly from the outer edge of the horizontal step 159 and fluidly connects to the debris collection cylinder 156 on a bottom side thereby joining the respective internal chambers 157 and 140. The bottom surface of the second stage debris collection chamber 140 sealingly mates to the debris release door 128 in selective fashion such that the second stage debris outlet 154 is isolated from the first stage debris outlet 142. The second stage collection chamber 140 can be formed by a separate second stage cyclone housing 162, or, alternatively, it can be formed as part of the outer housing 122.

In a preferred embodiment, the debris release door 128 is movable between a first and second position. In the first, closed position, shown in FIG. 8, the debris release door 128 is located adjacent to the bottom of the dirt cup wall 145 of the outer housing 122 and forms the bottom wall of the first and second stage collection chambers 136, 140. The door 128 is configured to selectively pivot away from the dirt cup wall 145, thus creating an opening at the bottom side of the first and second stage debris collection chambers 136, 140 to allow easy, simultaneous emptying of the outer and inner housings 122, 162.

The operation of the alternate cyclone module assembly 120 will now be described with reference to FIG. 8, in which the flow path of air is indicated by arrows. In operation, the vacuum fan/motor assembly 22 is positioned downstream of a cyclone outlet 132. When energized, the vacuum fan/motor assembly 22 draws air from the suction nozzle 38 to the cyclone inlet 130 and into the outer housing 122 where the dirty air to swirls around the first stage separation chamber wall 146 of the first stage cyclone separation chamber 134. Larger debris falls into the first stage collection chamber 136. The inward step 148 formed on the cyclone housing 122 functions to direct or urge the debris to the bottom of the collection chamber 136 and keep the separated debris contained in the collection chamber 136. The working air then passes through the grill assembly 124 to filter out any remaining large debris and enters the second stage separator 138 via the second stage inlets 152. The second stage inlets 152 directs the air tangentially and downwardly along an inside surface of the frusto-conical separator 126. The airflow turns near the second stage debris outlet 154 and proceeds directly upward and through the cyclone outlet 132. The dirt removed by the frusto-conical separator 126 falls into the second stage debris collector 155 beneath.

The second stage debris collector 155 collects and retains dirt that is removed from the working air stream in the inner housing 162 and dropped through the second stage outlet 154. The outward flare of the second frusto-conical chamber 157 reduces the velocity of the working air stream in the second stage debris collector 155, to prevent re-entrainment of dirt in the second stage collection chamber 140. The horizontal step 159 provides additional debris re-entrainment prevention by blocking any lingering debris swirling around the inner surface of the cone-shaped portion 160 from entering the second stage debris outlet 154. The working air continues to travel through the working air conduit 94 (FIG. 6) and is delivered to the pre-motor filter region 106 of the filter assembly 98, as described above, before passing through the vacuum fan/motor assembly 22, the exhaust filter region 108 of the filter assembly 98 and, finally, into the external atmosphere. To dispose of collected dirt and dust, the debris release door 128 can be selectively pivoted away from the bottom of the dirt cup housing 122 to allow debris to fall out of the first and second collection chambers 136, 140 simultaneously.

While the invention has been specifically described in connection with certain specific embodiments thereof, it is to be understood that this is by way of illustration and not of limitation. For example, while the cyclone module assemblies illustrated herein are shown having two stages of separation, it is understood that the improvements to the collection chamber could be applied to a single stage separator, or other types of cyclone separators. Reasonable variation and modification are possible with the scope of the foregoing disclosure and drawings without departing from the spirit of the invention which, is defined in the appended claims.

What is claimed is:

1. A vacuum cleaner comprising:
    a housing defining a cyclonic separator chamber for separating contaminants from a dirt-containing airstream and a collection chamber for receiving contaminants separated in the separator chamber, the housing comprising:
        a bottom wall;
        a sidewall comprising a lower collection chamber wall defining an exterior of the collection chamber, an upper separator chamber wall defining an exterior of the separator chamber, and a helical step joining the collection chamber wall and the separator chamber wall and dividing the separator chamber from the collection chamber to direct contaminants toward the bottom wall;
        an inlet in fluid communication with the separator chamber;
        an air outlet in fluid communication with the separator chamber; and
        a debris outlet for passage of contaminants separated from the dirt-containing airstream in the separator chamber to the collection chamber;
    a suction nozzle fluidly connected with the inlet; and
    a suction source fluidly connected to the suction nozzle and to the separator chamber for establishing and maintaining a dirt-containing airstream from the suction nozzle to the inlet;
    wherein the helical step extends outwardly from a lower end of the upper separating chamber wall to the upper end of the lower collection chamber wall such that the circumference of the collection chamber wall is larger than the circumference of the separator chamber wall; and
    wherein the debris outlet is defined by an annular gap that extends continuously around the entire inner circumference of the sidewall and is spaced inwardly from the helical step.

2. The vacuum cleaner according to claim 1 wherein the helical step extends around the circumference of the housing along an advancing helical trajectory.

3. The vacuum cleaner according to claim 1 wherein the housing further defines a second downstream cyclonic separator chamber and a second collection chamber for receiving contaminants separated in the second separator chamber.

4. The vacuum cleaner according to claim 1, and further comprising a separator plate separating the separator chamber from the collection chamber, the separator plate partially defining the gap.

5. The vacuum cleaner according to claim 1 wherein the sidewall is an outer sidewall of the housing.

6. The vacuum cleaner according to claim 1 wherein the helical step defines an outer helical wall of the housing.

7. The vacuum cleaner according to claim 1 wherein the collection chamber wall, the separator chamber wall, and the helical step are integrally formed with each other.

8. The vacuum cleaner according to claim 1 wherein the bottom wall comprises a moveable door for releasing contaminants from the collection chamber.

* * * * *